US00RE39536E

(19) United States
(12) Reissued Patent
Schrey et al.

(10) Patent Number: US RE39,536 E
(45) Date of Reissued Patent: Apr. 3, 2007

(54) METHOD AND PLANT UTILIZING FINE COAL IN A MELTER GASIFIER

(75) Inventors: Günter Schrey, Linz (AT); Parviz Zahedi, Asten (AT)

(73) Assignee: Deutsche Voest-Alpine Industrieanlagenbau GmbH (AT)

(21) Appl. No.: 10/160,864
(22) Filed: May 30, 2002

Related U.S. Patent Documents

Reissue of:
(64) Patent No.: 6,332,911
Issued: Dec. 25, 2001
Appl. No.: 09/476,239
Filed: Dec. 30, 1999

U.S. Applications:
(63) Continuation of application No. PCT/AT98/00165, filed on Jul. 3, 1998.

(30) Foreign Application Priority Data

Jul. 4, 1997 (AT) ..... A-1157/97

(51) Int. Cl.
*C21B 11/00* (2006.01)

(52) U.S. Cl. ..... 75/492; 75/325; 75/500; 266/160; 266/176

(58) Field of Classification Search ..... 75/492, 75/325, 500; 266/160, 176
See application file for complete search history.

(56) References Cited

U.S. PATENT DOCUMENTS 3,960,543 A * 6/1976 Schmalfeld et al. ..... 75/752
4,995,904 A * 2/1991 Hauk ..... 75/445

FOREIGN PATENT DOCUMENTS

| | | | |
|---|---|---|---|
| AT | 376241 | * | 10/1984 |
| AT | 401777 | * | 11/1996 |
| DE | 2407780 | * | 8/1975 |
| DE | 2640787 | * | 3/1978 |
| DE | 224331 | * | 7/1985 |
| DE | 3530240 | * | 5/1986 |
| EP | 0138100 | * | 4/1985 |
| EP | 0315825 | * | 5/1989 |

OTHER PUBLICATIONS

Patent Abstracts of Japan, vol. 006, No. 015 (C–089), Oct. 31, 1981.*
Database WPI, Section Ch Week 8850, Derwent Publications Ltd, London, GB; XP002077551 May 31, 1988.*
Patent Abstracts of Japan, vol. 015, No. 034 (C–1085), Mar. 19, 1993.*
Patent Abstracts of Japan, vol. 017, No. 382 (C–0799), Nov. 6, 1990.*
Patent Abstracts of Japan, vol. 015, No. 034 (C–0799), Nov. 6, 1990.
Patent Abstracts of Japan, vol. 017, No. 382 (C–1085), Mar. 19, 1993.

* cited by examiner

*Primary Examiner*—Melvyn Andrews
(74) *Attorney, Agent, or Firm*—Ostrolenk, Faber, Gerb & Soffen, LLP

(57) ABSTRACT

In a method for the production of liquid metal, in particular liquid pig iron (9) or liquid steel pre-products, from metal carriers, in particular partially reduced or reduced sponge iron (3), in a melter gasifier (1) in which with supply of a carbon-containing material at least partially formed of fine coal (16) and coal dust (13) and with supply of oxygen or oxygen-containing gas the metal carriers are melted in a bed (4) of the carbon-containing material at the simultaneous formation of a reducing gas, optionally upon previous final reduction, fine coal (16) and coal dust (13) which are being charged, are mixed with bitumen (20) in the hot state, after undergoing a drying operation, and subsequently are cold-briquetted, and the briquettes (25) thus formed are charged to the melter gasifier (1) in the cold state and in the melter gasifier (1) are subjected to shock-heating.

22 Claims, 1 Drawing Sheet

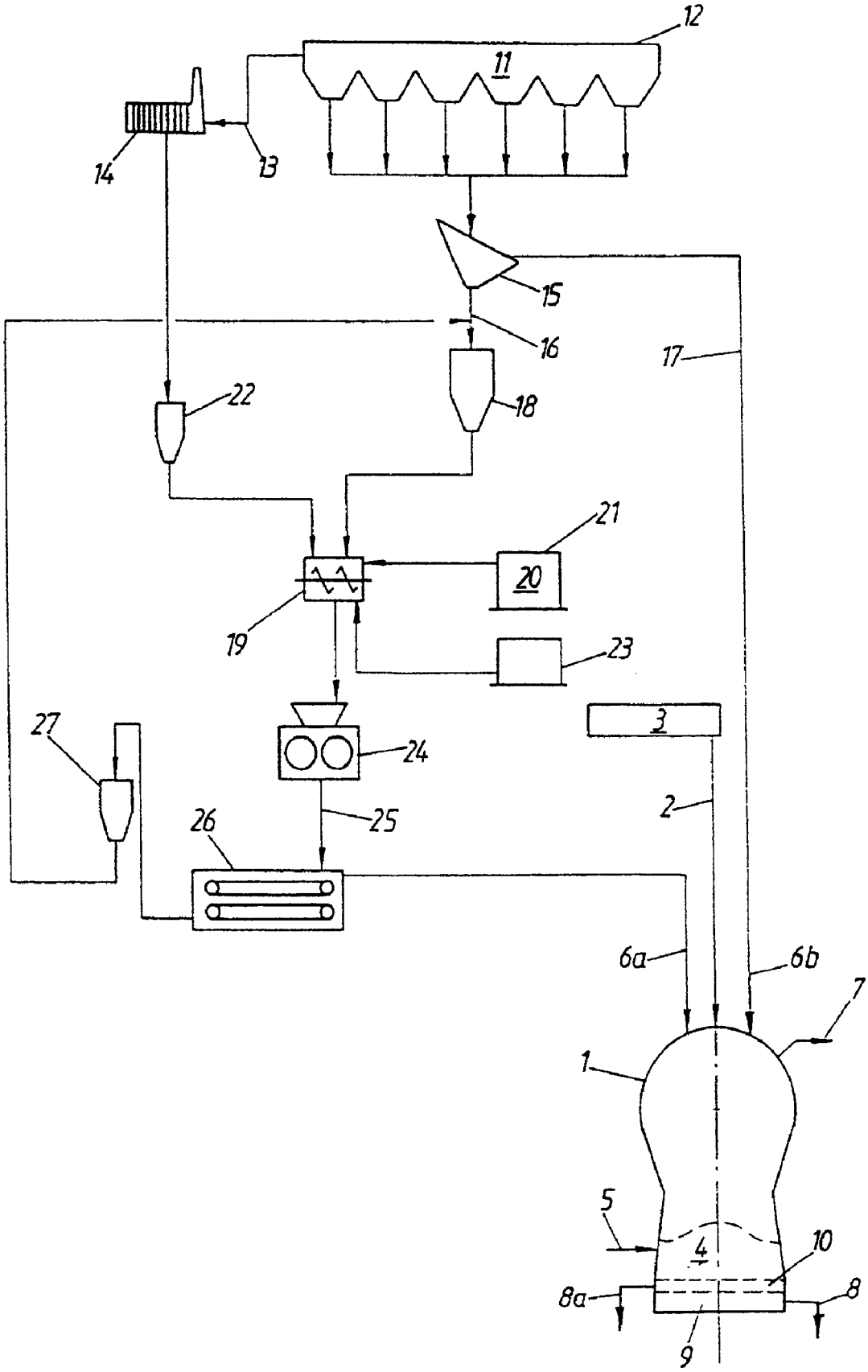
12
11
14
13
15
16
17
22
18
21
20
19
23
27
24
3
2
26
25
6a
6b
7
1
5
4
10
8a
8
9

METHOD AND PLANT UTILIZING FINE COAL IN A MELTER GASIFIER

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation application of International Application PCT/AT98/00165, with an International filing date Jul. 3, 1998.

The invention relates to a method for the production of liquid metal, in particular liquid pig iron or liquid steel pre-products, from metal carriers, in particular partially reduced or reduced sponge iron, in a melter gasifier in which with supply of a carbon-containing material at least partially formed of fine coal and coal dust and supply of oxygen or oxygen-containing gas the metal carriers are melted in a bed of the carbon-containing material at the simultaneous formation of a reducing gas, optionally upon previous final reduction, and a plant for carrying out the method.

One problem arising in the charging of fine-particulate carbon-containing material, such as fine coal and coal dust, to a melter gasifier is that the fine-particulate carbon-containing material due to the gas velocities existing in the melter gasifier is instantly carried out of the same again. This also applies to fine-particulate ore to the same degree. To prevent this, it has f.i. been proposed in AT-B-401 777 to charge carbon carriers to the melter gasifier together with fine ore and/or ore dust by means of dust burners, namely to the lower region of the melter gasifier. With this process, substoichiometric combustion of the charged carbon carriers takes place. One disadvantage of this is that the carbon carriers cannot contribute to the formation of a bed made up of solid carbon carriers in the melter gasifier.

It is internally known to charge fine-particulate coal to a melter gasifier in the upper region thereof, wherein the fine-particulate coal is reacted to coke, the coke is carried out along with reducing gas and is separated and together with fine-particulate material is subsequently supplied to a melter gasifier via a burner. However, this also does not contribute to the formation of a bed of carbon-containing material.

Such as bed is usually formed from lumpy coal which has to have a high thermal stability. Due to the development of the coal market, which is governed by the demands of the operators of coal-fired power stations, the situation may arise that fine coal is preferentially offered, for the coal dust burners that are customary today. Grate firings, which were formerly the practice and which necessitated the charging of lumpy coal, now only play a minor role in the market of coal consumers. As a consequence thereof, the fines portion of the coals offered in the market may assume considerable proportions, ranging in the order of up to 50 to 70%.

When charging such coals to a melter gasifier, the coal fines usually must be screened out first, so that only the coarse fraction, i.e. the lumpy coal, will be available for charging to the melter gasifier. The fines are put to use elsewhere.

The invention has as its object to also utilize the fines in a useful manner in that they contribute to the formation of a bed of carbon-containing material in the melter gasifier, thus making it possible to reduce the cost of charging lumpy carbon-containing material.

According to the invention, this object is achieved in that, after undergoing a drying operation, fine coal and coal dust which are being charged are mixed with bitumen in the hot state and subsequently are cold-briquetted, and that the briquettes thus formed are charged to the melter gasifier in the cold state and in the melter gasifier are subjected to shock-heating.

Surprisingly, it has been found that the briquettes so produced exhibit an excellent thermal stability that even exceeds the thermal stability of lumpy carbon-containing material. The briquettes show very slight disintegration at the shock-like action of the temperatures of the melter gasifier of about 1000° C. This is due to the properties of the bitumen used as a binding agent, which melts rapidly at the indicated high temperature and thus occasions a beneficial bridging effect between the coal particles. What is essential here is that the bitumen does not evolve gas at the indicated temperature and besides retains its doughy consistence and its binding power.

From DE-A-24 07 780 it is known to charge pit-coal briquettes made from a mixture of treated high-grade, in particular anthracite and/or nonbituminous fine coal or fine coal as the charging coal and high-vacuum bitumen as a binding agent, with the briquettes thus produced serving for firing, f.i. in domestic stoves, or optionally, if they are subjected to a thermal process such as oxidation, low-temperature carburization or coking, being even suitable for charging to a blast furnace. Yet, these briquettes fulfil different requirements than the briquettes produced according to the invention, the more so since with the briquettes of the present invention it is thermal stability that matters, that is to say, the briquettes should not burst even at sudden temperature shocks in the case of charging to a melter gasifier, whereas according to DE-A-24 07 780 it is important that the briquettes exhibit a high stability, that is a high resistance to pressure, to enable charging them to the blast furnace. In accordance with the known method, the high-vacuum bitumen is heated to 200° C. and after mixing with the fine coal is briquetted at a temperature of about 85° C. Due to the high portion of coke formers in the known briquettes there is formed a coke network, whereby a high stability results.

According to a preferred embodiment, fine coal and coal dust are separated during and/or after drying of the carbon-containing material being charged and are further treated in the hot state.

Lumpy carbon-containing material arising in the separation of the fine coal and of the coal dust according to a preferred embodiment of the method of the invention is charged to the melter gasifier directly.

Preferably, fine coal with a particle size smaller than or equal to 8 mm is separated from the carbon-containing material.

From EP-B-0 315 825 there is known a method of the type initially described, in which fine coal after grinding is mixed with a binding agent, for example lime, molasses, pitch or tar, and is granulated, whereupon it is introduced into a melter gasifier. However, according to the invention, not a granulating but a briquetting operation is carried out, with the briquettes exhibiting a higher thermomechanical stability as compared to the granulates. A further disadvantage arising in accordance with EP-B-0 315 825 is the substantial expenditure of energy necessary for grinding the fine coal. According to the invention, this disadvantage is avoided in that the carbon-containing material being charged is not ground, but the fine coal and the coal dust are separated.

From AT-B-376 241, a method is known according to which the solids made up of dust-like carbon which have been entrained out of a melter gasifier by the reducing gas are separated from the reducing gas and agglomerated and the thus-formed agglomerates, in particular shaped coke, are recycled to the melter gasifier. Yet, unlike with the invention, the carbon-containing material being charged is not agglomerated here, and fine coal cannot be charged on a larger scale. With the method according to AT-B-376 241, a further disadvantage arises in that the agglomerating means is arranged directly after the hot cyclone serving for separating the dust-like carbon, which necessitates considerable expenditures in terms of construction.

According to the invention, the fine coal or the coal dust separated from the carbon-containing material being charged is mixed with bitumen and briquetted, with the briquetting being arranged downstream of the drying of the carbon-containing material. In doing so, the heat content of the fine coal and the coal dust after drying is suitably made use of in the mixing with the bitumen and in briquetting. No additional thermal energy has to be expended for briquetting.

According to a preferred embodiment of the method, the fine coal and the coal dust are mixed with the bitumen at a temperature below 100° C., preferably at a temperature between 75 and 80° C. Advantageously, bitumen with a softening point below 80° C., preferably below 75° C., is charged.

Optionally, heat is additionally supplied during the mixing operation, to ensure softening of the bitumen.

According to a preferred embodiment of the method of the invention, up to 30% petroleum coke is charged as carbon-containing material, which as such shows insufficient thermal stability. The briquettes obtained by proceeding in accordance with the invention nevertheless show a sufficient degree of thermal stability.

Preferably, the carbon-containing material being charged is dried to a residual moisture content below 5%.

According to a variant, briquette chips are separated from the briquettes formed from the fine coal and the coal dust and are recycled into the briquetting process.

The briquettes, formed from the fine coal and the coal dust, are advantageously cooled to a temperature below 30° C. during and/or after briquetting. They exhibit a particularly high temperature stability, as a result especially of the shock heating at charging to the melter gasifier.

According to the invention, there is suitably charged coal having an ash content of 10 to 25%. As a result of this, the method of the present invention is marked by particularly great economic efficiency, such that even the liquid metal obtained from partially or completely reduced metal ores by melting in the melter gasifier can be produced at a favorable cost, because to the melter gasifier, as has been initially described, the very same carbon-containing material is charged that is utilized for producing the briquettes, which arise, as it were, as a by-product in the utilization of the fine-particle portion of the carbon-containing material.

According to the invention, there further is charged coal having volatile portions of between 18 and 35%. Hence it is not necessary to utilize high-grade coal.

Preferably, the fine coal and the coal dust at the temperature at which they exit the coal drying are mixed with bitumen of roughly the same temperature, wherein suitably the temperature of the material that is to be mixed is 70 to maximally 100° C., preferably 75 to 85° C., at the time of mixing. Hereby, a good binding effect of the bitumen is assured as well as economical temperature control. Moreover, the mixed product formed of fine coal, coal dust and bitumen need not be cooled at all or only to a slight extent before it is briquetted.

A further advantage of the method of the present invention is to be seen in that bitumen of the type customarily employed in road construction in a given place may be used as the bitumen. Accordingly, there is no need for special requirements with regard to the bitumen.

A plant for carrying out the method of the present invention, comprising a melter gasifier, a feed duct for metal carriers, in particular for partially reduced or reduced sponge iron, opening into the melter gasifier, feed ducts for oxygen or an oxygen-containing gas and for a carbon-containing material formed at least partially from fine coal and coal dust, a discharge duct departing from the melter gasifier for a reducing gas formed in the melter gasifier, and a tap for pig iron and slag provided on the melter gasifier, is characterized in that a drying means is provided for the drying of carbon-containing material that is being charged, downstream of which there are connected a mixer and, subsequently thereto, a cold-briquetting means for briquetting fine coal and coal dust, with the cold-briquetting means being flow-connected with the gasifier.

According to a preferred embodiment, a separating means is provided for separating fine coal and coal dust from the carbon-containing material being charged.

According to another preferred embodiment, a feed duct is provided for charging lumpy carbon-containing material directly into the melter gasifier.

Suitably, a steam generator is provided for heating the mixer.

Between the cold-briquetting means and the melter gasifier there preferably is provided a means for separating briquette chips.

The invention will now be described in more detail with reference to the drawing, which illustrates a preferred embodiment of the invention.

In the drawing, the reference number 1 denotes a melter gasifier to which at least partially reduced sponge iron 3 is charged via a feed duct 2, which sponge iron, optionally after final reduction, is melted in the melter gasifier 1, namely while passing through a bed 4 of carbon-containing material. The melter gasifier 1 is further provided with a feed duct 5 for oxygen or an oxygen-containing gas, with feed ducts 6a, 6b for carbon-containing material, with a discharge duct 7 for a reducing gas generated in the melter gasifier 1 as well as with separate taps 8, 8a for molten pig iron 9 and molten slag 10, respectively.

The carbon-containing material 11 being charged is dried in a first drying means 12. The coal dust 13 thus arising is withdrawn and subjected to further treatment in a second drying means 14. The carbon-containing material discharged from the first drying means 12 in the hot state, which is at a temperature of about 60° C., is supplied to a separating means 15, for example a sieve, and, in the process, fine coal 16 is separated from lumpy carbon-containing material 17. For example, fine coal 16 having a particle size equal to or smaller than 8 mm is separated.

The lumpy carbon-containing material 17 via the feed duct 6b is supplied directly to the melter gasifier 1. In contrast thereto, the fine coal 16 passes into a storage vessel 18 and therefrom passes to a mixer 19 in which the fine coal 16 is mixed with bitumen 20 taken from a bitumen tank 21.

There is also fed to the mixer 19 the coal dust 13 from the second drying means 14, which is intermediately stored in a powdered-coal storage bin 22.

The mixer 19 is heated to about 75–80° C. using steam produced in the steam generator 23. In this way it is ensured that the softening point of the supplied bitumen 20 is exceeded. But it is also possible that the heat content of the fine coal 16 will be sufficient to supply the thermal energy required for softening the bitumen 20, so that no additional energy in the form of steam will have to be expended therefor.

The charged bitumen 20 may be ordinary residual asphalt of the type used in road construction, with a softening point below 75° C., which is available all over the world at a favorable cost, f.i. bitumen of the type B70 in accordance with ÖNORM B3610, having the following specifications:

Softening point (Ring and Ball method) (ÖNORM C 9212): 47–54° C.

Needle penetration at 25° C. (ÖNORM C 9214): 50–80 $mm \times 10^{-1}$

The mixture of fine coal 16, coal dust 13 and bitumen 20 is subsequently cold-briquetted using a cold-briquetting means 24, at a temperature of about 70 to 75° C., i.e. no additional thermal energy is expended for briquetting. The briquettes 25 so produced are finally supplied to a means 26 for separating briquette chips not having the size required for charging to the melter gasifier 1, which means 26 at the same time serves as a cooling means. In the process, the briquettes 25 are cooled to a temperature below 30° C.

Briquette chips which are not of the size required for charging to the melter gasifier 1 are recycled to the briquetting process. They first pass into a collecting vessel 27 and from there into the storage vessel 18 for fine coal 16.

The briquettes 25 via the feed duct 6a are fed into the melter gasifier 1, where they are subjected to shock-heating. Surprisingly, the briquettes 25 have been found to exhibit an extremely high thermal stability which is even higher than the thermal stability of the lumpy carbon-containing material 17, as is elucidated by means of the following Example.

South African and Australian pit coal were dried and screened according to the method of the invention, wherein a fraction of lumpy coal and of coal dust and fine coal was obtained. The coal dust and the fine coal were briquetted applying the briquetting process of the invention. The thermal stability of the briquettes thus produced was then compared with the thermal stability of the respective lumpy coal.

The thermal stability was determined in that a charge fraction having a particle size from 10 to 16 mm was subjected to thermal treatment and after being thermally treated was screened. The portions having a particle size in excess of 10 mm and having a particle size below 2 mm, respectively, were weighed separately and have been expressed as percentages of the amount charge. The results have been summed up in Table 1.

TABLE 1

| Thermal | South African Pit Coal | | Australian Pit Coal | |
|---|---|---|---|---|
| stability | Charging coal | Briquettes | Charging coal | Briquettes |
| +10 mm % | 77.6 | 86.4 | 77.7 | 82.4 |
| −2 mm % | 3.1 | 2.6 | 3.4 | 2.4 |

The higher the portion with a particle size in excess of 10 mm and the lower the portion with a particle size below 2 mm, the greater was the thermal stability. As is clearly visible from Table 1, the thermal stability of the briquettes produced by the method of the invention was considerably greater than that of the respective lumpy coal.

By proceeding in accordance with the invention, briquettes of fine coal and coal dust are therefore provided which show an exceedingly high thermal stability, allowing them to be charged to a melter gasifier without further ado, wherein the disintegration of the briquettes is very slight even at the shock-like action of the temperatures of the melter gasifier of about 1000° C. This renders it feasible to charge fine coal and coal dust to a melter gasifier in an economical manner, namely such that the briquettes produced from the fine coal and the coal dust contribute to the formation of a bed of carbon carriers in the melter gasifier, thereby enabling considerable savings in terms of the cost of charging lumpy carbon-containing material.

What is claimed is:

[1. Method for the production of liquid metal from metal carriers (3) in a melter gasifier (1) in which with supply of a carbon-containing material at least partially formed of fine coal (16) and coal dust (13) and with supply of oxygen or oxygen-containing gas the metal carriers are melted in a bed (4) of the carbon-containing material with the simultaneous formation of a reducing gas, optionally upon previous final reduction, characterized in that fine coal (16) and coal dust (13) are mixed with hot bitumen (20) and subsequently are cold-briquetted, and that the briquettes (25) thus formed are charged to the melter gasifier (1) and in the melter gasifier (1) are subjected to shock-heating, and wherein the charged carbon-containing material is dried and during and/or after drying of the carbon-containing material, the fine coal (16) and coal dust (13) are separated from lumpy carbon-containing material and further treated while hot.]

[2. Method according to claim 1, characterized in that the liquid metal is pig iron (9) or liquid steel pre-products and the metal carrier is at least partially reduced sponge iron.]

[3. Method according to claim 1, characterized in that lumpy carbon-containing material (17) obtained in the separation of the fine coal (16) and of the coal dust (13) is charged to the melter gasifier (1) directly.]

[4. Method according to claim 1, characterized in that the separated fine coal (16) has a particle size smaller than or equal to 8 mm.]

[5. Method according to claim 1, characterized in that the fine coal (16) and the coal dust (13) are mixed with the bitumen (20) at a temperature below 100° C.]

[6. Method according to claim 1, characterized in that bitumen (20) with a softening point below 80° C. is charged.]

[7. Method according to claim 1, characterized in that during the mixing operation, heat is additionally supplied.]

[8. Method according to claim 1, characterized in that up to 30% petroleum coke is charged as carbon-containing material.]

[9. Method according to claim 1, characterized in that the carbon-containing material being charged is dried to a residual moisture content below 5% before being charged.]

[10. Method according to claim 1, characterized in that briquette chips formed during briquetting are separated from the briquettes (25) formed from the fine coal (16) and the coal dust (13) and are recycled into the briquetting process.]

[11. Method according to claim 1, characterized in that the briquettes (25), formed from the fine coal (16) and the coal dust (13), are cooled to a temperature below 30° C. during and/or after briquetting.]

[12. Method according to claim 1, characterized in that the coal (16, 13) charged has an ash content of 10 to 25%.]

[13. Method according to claim 1, characterized in that the coal (16, 13) charged has volatile portions of between 18 and 35%.]

[14. Method according to claim 1, characterized in that the fine coal (16) and the coal dust (13) at the temperature at which they exit the coal drying are mixed with bitumen (20) of roughly the same temperature.]

[15. Method according to claim 14, characterized in that the temperature of the fine coal, coal dust and bitumen (13, 16, 20) that are to be mixed is 70° to maximally 100° C. at the time of mixing.]

[16. Method according to claim 15, wherein the temperature of fine coal, coal dust and bitumen to be mixed is between 75° and 85° C.]

[17. Plant for the production of liquid metal from metal carriers comprising a melter gasifier (1), a feed duct (2) for metal carriers opening into the melter gasifier (1), feed ducts (5, 6a, 6b) for oxygen or an oxygen-containing gas and for a carbon-containing material formed at least partially from fine coal (16) and coal dust (13), a discharge duct (7) departing from the melter gasifier (1) for a reducing gas formed in a melter gasifier (1), and a tap (8, 8a) for pig iron (9) and slag (10) provided on the melter gasifier (1), characterized in that a drying means (12) is provided at an upstream end of the plant for the drying of carbon-containing material (11) that is being charged, downstream of which there are connected a mixer (19), together with means (21) for providing bitumen (20) to said mixer (19), and, subsequently thereto, a cold-briquetting means (24) for briquetting fine coal (16) and coal dust (13), with the cold-briquetting means (24) being flow-connected with the gasifier (1).]

[18. Plant according to claim 17, characterized in that a separating means (15) is provided downstream of the drying means for separating fine coal (16) and coal dust (13) from the carbon-containers material being charged.]

[19. Plant according to claim 17, characterized in that a feed (6b) is provided between the drying means (12) and the melter gasifier (1) for charging lumpy carbon-containing material (17) directly into the melter gasifier (1).]

[20. Plant according to claim 17, characterized in that a steam generator (23) is provided for heating the mixer (19).]

[21. Plant according to claim 17, characterized in that between the cold-briquetting means (24) and the melter gasifier (1) there is provided a means (26) for separating briquette chips.]

[22. Method according to claim 5, wherein the temperature is between 75° and 80° C.]

[23. Method according to claim 6, wherein the softening point is below 75° C.]

*24. A method for the production of liquid metal from metal carriers in a melter gasifier in which the metal carriers are melted in a bed of carbon-containing material in the presence of oxygen or oxygen-containing gas, and with the simultaneous formation of a reducing gas, the method comprising the steps of:*

*providing a supply of a carbon-containing material at least partially formed of fine coal and coal dust,*

*drying the fine coal and coal dust;*

*mixing the fine coal and coal dust with hot bitumen;*

*cold-briquetting the mixture of fine coal, coal dust, and hot bitumen;*

*forming a bed of carbon-containing material including the briquettes in the melter gasifier; and*

*subjecting the briquettes to shock-heating in the melter gasifier.*

*25. A method according to claim 24, further including the steps of:*

*separating fine coal and coal dust from other components of the carbon containing material, and*

*providing the carbonl containing material remaining after separation of the fine coal and coal dust as part of the bed without briquetting.*

*26. A method according to claim 25, wherein the separated fine coal has a particle size smaller than or equal to 8 mm.*

*27. A method according to claim 24, wherein the fine coal and the coal dust are mixed with the bitumen at a temperature below 100° C.*

*28. A method according to claim 24, wherein the bitumen has a softening point below 80° C.*

*29. A method according to claim 24, further including the step of supplying additional heat during the mixting of the fine coal and coal dust with the hot bitumen.*

*30. A method according to claim 24, wherein the carbon-containing material includes up to 30% petroleum coke.*

*31. A method according to claim 24, wherein the residual moisture of the dried carbon-containing material is below 5%.*

*32. A method according to claim 24, wherein chips formed during briquetting are separated from the briquettes and are recycled into the briquetting process.*

*33. A method according to claim 24, further including the step of cooling the briquettes during or after formation thereof to a temperature below about 30° C.*

*34. A method according to claim 24, wherein the ash content of the coal comprising the carbon-containing bed is about 10 to about 25%.*

*35. A method according to claim 24, wherein the volatile content of the coal comprising the carbon-containing bed is of between about 18 and about 35%.*

*36. A method according to claim 24, wherein the bitumen is at approximately the same temperature as the fine coal and coal dust after drying when the bitumen is mixed with the dried fine coal and coal dust.*

*37. A method according to claim 36, wherein the temperature of the fine coal, coal dust and bitumen are mixed at a temperature of between about 70° and about 100° C.*

*38. A method according to claim 37, wherein the temperature of the fine coal, coal dust and bitumen are mixed at a temperature of between about 75° and about 85° C.*

*39. Apparatus for production of liquid metal from metal carriers comprising:*

*a melter gasifier,*

*first, second, third, and fourth respective sources for metal carriers, oxygen or oxygen-containing gas, and carbon-containing material including fine coal and coal dust and bitumen;*

*a first feed duct opening into the melter gasifier for the metal carriers;*

*a second feed duct opening into the melter gasifier for the oxygen or oxygen-containing gas;*

*a third feed duct opening into the melter gasifier for the carbon-containing material;*

*a discharge duct from the melter gasifier for a reducing gas formed therein;*

*first and second taps on the melter gasifier for pig iron and slag respectively;*

*a dryer located between the third source and the third feed duct for drying the carbon-containing material before delivery to the melter gassifier;*

*a mixer for the dried carbon-containing material and the bitumen; and*

*a cold briquetter located between the mixer and the third feed duct.*

*40. Apparatus according to claim 39, further including a separator downstream of the dryer operative to separate fine coal and coal dust from the carbon-containing material.*

*41. Apparatus according to claim 40, further including:*

*a first feed path connected to the separator to deliver the separated fine coal and coal dust to the mixer; and*

*a second feed path connected to the separator to deliver residual carbon-containing material from which fine coal and coal dust has been separated directly to as fourth feed duct into the melter gasifier.*

*42. Apparatus according to claim 39, further including a steam generator connected to provide heat to the mixer.*

*43. Apparatus according to claim 39, further including:*

*a separator operative to remove briquette chips from the briquettes before delivery thereof to the third feed duct; and*

*a feed path to deliver the briquette chips for return to the mixer.*

*44. A method according to claim 27, wherein the temperature is between about 75° and 80° C.*

*45. A method according to claim 28, wherein the softening point is below about 75° C.*

* * * * *